US012182252B2

(12) United States Patent
Kataoka

(10) Patent No.: US 12,182,252 B2
(45) Date of Patent: Dec. 31, 2024

(54) INFORMATION PROCESSING DEVICE WITH PASSWORD FUNCTION, AND PASSWORD SETTING METHOD

(71) Applicant: TOSHIBA TEC KABUSHIKI KAISHA, Tokyo (JP)

(72) Inventor: Mitsuhiro Kataoka, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 589 days.

(21) Appl. No.: 17/229,956

(22) Filed: Apr. 14, 2021

(65) Prior Publication Data

US 2022/0043903 A1    Feb. 10, 2022

(30) Foreign Application Priority Data

Aug. 7, 2020    (JP) .................................. 2020-135045

(51) Int. Cl.
| | |
|---|---|
| *G06F 21/45* | (2013.01) |
| *G06F 3/12* | (2006.01) |
| *G06F 21/60* | (2013.01) |
| *G06K 7/14* | (2006.01) |
| *G06K 19/06* | (2006.01) |

(52) U.S. Cl.
CPC ............ *G06F 21/45* (2013.01); *G06F 3/1293* (2013.01); *G06F 21/608* (2013.01); *G06K 7/1417* (2013.01); *G06K 19/06037* (2013.01)

(58) Field of Classification Search
CPC ......... G06F 21/608; G06F 21/44; G06F 21/45
See application file for complete search history.

(56) References Cited

U.S. PATENT DOCUMENTS

| | | | | |
|---|---|---|---|---|
| 2004/0143451 A1* | 7/2004 | McIntyre | ................ | G06F 21/31 705/51 |
| 2014/0232882 A1* | 8/2014 | Yamada | .................... | G06T 1/00 348/207.1 |
| 2014/0376027 A1* | 12/2014 | Adachi | .............. | G06K 15/4095 358/1.14 |
| 2015/0128239 A1* | 5/2015 | Kakutani | .............. | H04L 63/083 726/7 |

(Continued)

FOREIGN PATENT DOCUMENTS

JP    2005-094374    4/2005

*Primary Examiner* — Dao Q Ho
(74) *Attorney, Agent, or Firm* — FOLEY & LARDNER LLP

(57) ABSTRACT

An objective is to notify a user that a password is not set yet and to provide the user with necessary information for setting a password, when connected to a network. An information processing device includes a communication interface, a printer, a memory, and a processor. The processor is configured to (i) acquire setting information and address information from a server on the network via the communication interface when the communication interface is connected to the network where (a) the setting information includes a password setting state and (b) the address information includes information for accessing a password setting screen for setting the password, (ii) check the password setting state of the password based on the setting information; and (iii) control the printer to print a guide including the address information to direct the user to the password setting screen in response to the password not being set.

13 Claims, 5 Drawing Sheets

---

WARNING

PASSWORD IS NOT SET YET ON THIS PRINTER.
THIS INFORMATION PROCESSING DEVICE REJECTS DATA
FROM HOST TRANSMITTED VIA LAN,
IF CERTIFICATION INFORMATION IS NOT CORRECTLY SET UP.

ACCESS LINK SHOWN IN CONNECTION ADDRESS INFORMATION BELOW
AND SET UP CERTIFICATION INFORMATION

[CONNECTION ADDRESS INFORMATION]
http://192.168.1.4

(56) References Cited

U.S. PATENT DOCUMENTS

| | | | |
|---|---|---|---|
| 2015/0294106 A1* | 10/2015 | Yang | G06F 21/45 |
| | | | 726/18 |
| 2015/0309672 A1* | 10/2015 | Miwa | G06F 16/583 |
| | | | 715/838 |
| 2016/0004851 A1* | 1/2016 | Suzuki | G06F 21/31 |
| | | | 726/7 |
| 2017/0168669 A1* | 6/2017 | Ohira | H04N 1/00411 |
| 2017/0192725 A1* | 7/2017 | Choi | G06F 3/1292 |
| 2018/0203652 A1* | 7/2018 | Narita | G06F 3/1286 |
| 2022/0043903 A1* | 2/2022 | Kataoka | G06K 19/06037 |

* cited by examiner

WARNING

PASSWORD IS NOT SET YET ON THIS PRINTER.
THIS INFORMATION PROCESSING DEVICE REJECTS DATA
FROM HOST TRANSMITTED VIA LAN,
IF CERTIFICATION INFORMATION IS NOT CORRECTLY SET UP.

ACCESS LINK SHOWN IN CONNECTION ADDRESS INFORMATION BELOW
AND SET UP CERTIFICATION INFORMATION

[CONNECTION ADDRESS INFORMATION]
http://192.168.1.4

INFORMATION PROCESSING DEVICE WITH PASSWORD FUNCTION, AND PASSWORD SETTING METHOD

CROSS-REFERENCE TO RELATED APPLICATION

This application is based upon and claims the benefit of priority from Japanese Patent Application No. 2020-135045, filed on Aug. 7, 2020, the entire contents of which are incorporated herein by reference.

FIELD

Embodiments described herein relate generally to an information processing device with a password function, and a password setting method.

BACKGROUND

Recently, in order to strengthen the security of an information processing device connected to a network such as the internet, a way of using the information processing device in which password setting by a user is mandatory is known. The information processing device used in such a way, that is, an information processing device with a so-called password function, cannot perform information processing using a network unless the user sets a password. However, the information processing device can perform information processing that does not use a network. Therefore, there can be a situation where, as the user continues using the information processing device without noticing that a password is not set, the information processing device, when needing to perform information processing using a network, cannot perform the information processing because a password is not set yet.

In order to prevent such trouble, the user needs to be notified that a password is not set yet when the information processing device is connected to a network. It is desirable not only that the user is notified that a password is not set yet, but also that the user is provided with necessary information for setting a password.

DETAILED DESCRIPTION

An embodiment described herein is to provide an information processing device with a password function that cannot only notify a user that a password is not set yet, but also provide the user with necessary information for setting a password, when connected to a network.

In general, according to one embodiment, an information processing device with a password function includes a communication unit (a communications interface, a transceiver, wireless communication components, wired communication components, etc.), a printing unit (a printer), a memory unit (a memory, a memory device), an acquisition unit, and a processor (processing circuit, controller). The communication unit communicates data via a network. The printing unit prints and outputs print data received via the communication unit. The memory unit stores a password set by a user. The acquisition unit acquires setting information set from a server on the network. The processor checks a setting state of the password when the communication unit is connected to the network. If the password is in a non-set state, the processor causes the printing unit to print and output a guide that leads to a password setting screen where address information included in the setting information acquired by the acquisition unit is a connection address.

An information processing device with a password function according to an embodiment will now be described with reference to the drawings. In this embodiment, a printer that prints on a paper is described as an example. The printer is an example of an information processing device in which password setting by a user is mandatory when connected to a network such as the internet, that is, an information processing device with a so-called password function.

Figure 1:
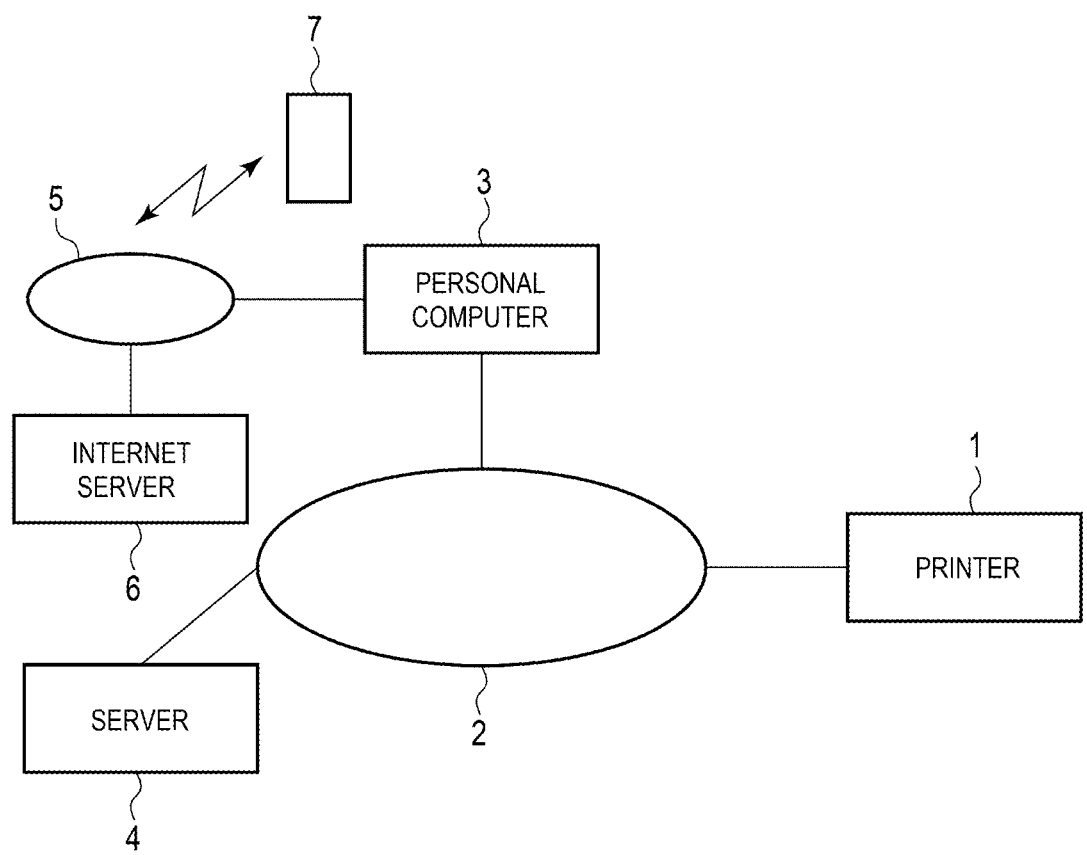
FIG. 1 conceptually shows a network system including an information processing device according to an embodiment.

FIG. 1 conceptually shows a network system including a printer 1 according to an embodiment. As shown in FIG. 1, the printer 1 is used as connected to a network 2. The network 2 is, for example, a local area network (LAN) such as Ethernet (trademark registered), or the internet. The printer 1 prints and outputs information transmitted from an external device such as a personal computer 3 connected to the network 2. Operating the personal computer 3 enables various initial settings and setting changes on the printer 1.

The network 2 is provided with a server 4 such as a Dynamic Host Configuration Protocol (DHCP) server that allocates an IP address or the like to a device connected thereto. Also, the personal computer 3 may be provided with a DHCP server function.

The personal computer 3, which is an external device, is connected to an internet server 6 via the internet 5 to which the personal computer 3 is connectable via a wire or wirelessly. The internet server 6 is a device installed by the manufacturer or the like of the printer 1 and manages information about the printer 1, for example, user manual, specifications, and setting information about various functions. In this embodiment, information of a password setting screen including password setting procedures for the printer 1 is downloaded from the internet server 6 to the personal computer 3. The password setting screen is information that represents password setting procedures and therefore need not necessarily be displayed on the personal computer 3. The password setting screen may be displayed on the display screen of another mobile device 7 that is connectable to the internet server 6, such as a smartphone.

Figure 2:
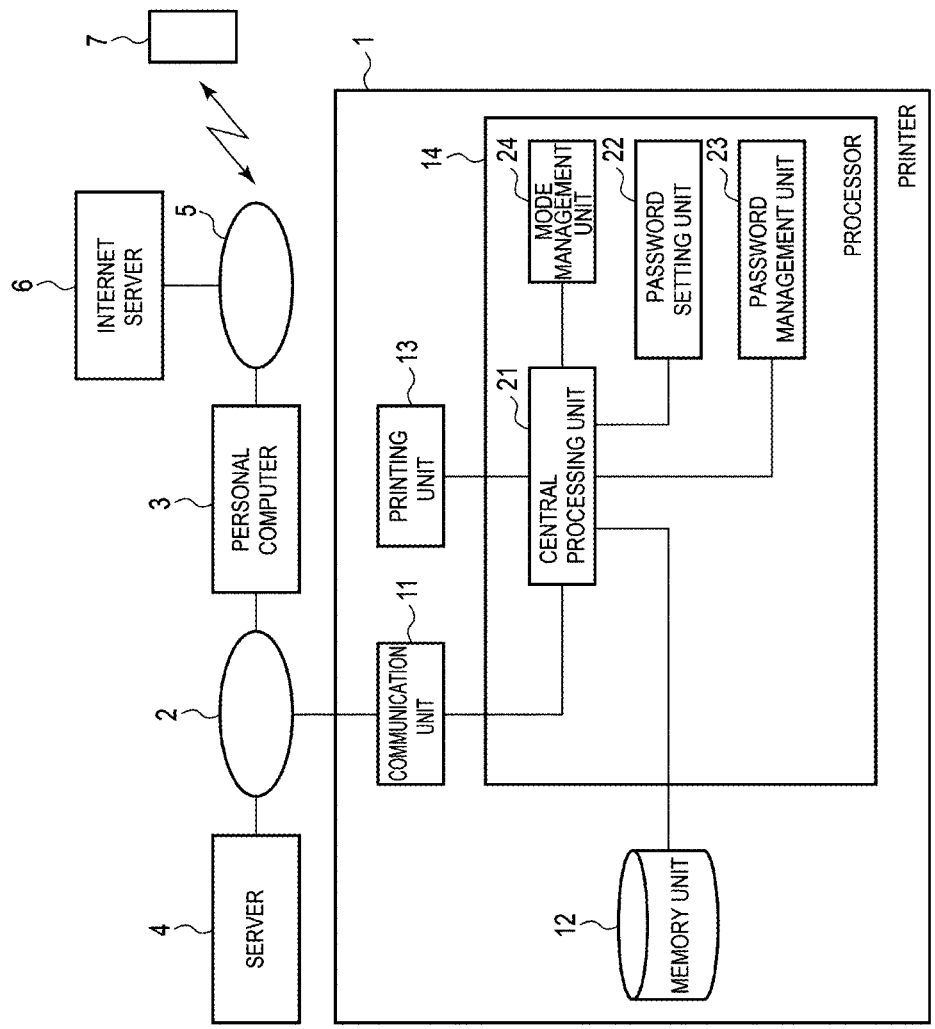
FIG. 2 is a block diagram showing the configuration of the information processing device.

FIG. 2 is a block diagram showing the configuration of the printer 1. The printer 1 has at least a communication unit 11 (a communications interface, a transceiver, etc.), a memory unit 12 (a memory, a memory device, etc.), a printing unit 13 (a printing mechanism, a printing assembly, a printer, etc.), and a processor 14 (a controller, a control system, etc.).

The communication unit 11 connects to an information device, for example, the personal computer 3, via the network 2 to which the communication unit 11 is connected via a wire or wirelessly, and the communication unit 11 communicates data. In this embodiment, the communication unit 11 transmits and receives data to and from the personal computer 3 under the control of the Transmission Control Protocol/Internet Protocol (TCP/IP). When wirelessly communicating with the network 2, the communication unit 11 may conform to, for example, "IEEE 802.11b/g/a", which is a wireless LAN standard. The communication unit 11 can also communicate data via a USB interface.

The memory unit 12 is a memory device equipped with a suitable combination of a non-volatile memory for reading only such as a read-only memory (ROM), or a non-volatile memory that can be written and read at any time such as a flash ROM, a solid-state drive (SSD) or a hard disk drive (HDD), and a volatile memory that can be written and read at any time such as a random-access memory (RAM). The memory unit 12 stores a control program for driving the processor 14 and the printing unit 13, and data transmitted from an external device such as the personal computer 3. Data that is transmitted from the personal computer 3 and temporarily stored may be automatically erased after the data is printed and outputted or after a predetermined time, or may be erased by an operator's operation. The memory unit 12 also stores password non-setting warning information and password setting guide information in advance. Based on these pieces of information, the printing unit 13 prints and outputs a warning message, which will be described later, and a guide that leads to a password setting screen.

The printing unit 13 is a printer that prints and outputs, on a paper sheet, an image including a letter or numeral based on data transmitted from the personal computer 3 or data read out from an external memory such as a USB memory. The printing unit 13 can employ, for example, a laser beam printing method, an inkjet printing method or the like, or a thermal printing method that prints on a predetermined paper sheet by thermal transfer or thermal sensing.

The printing unit 13 prints and outputs setting information on a predetermined paper sheet if a password is not set yet when the printer 1 is newly connected to the network 2. This setting information is a guide that leads to a password setting screen, which will be described later. The printing unit 13 may also print and output a combination of a guide and a warning message according to need. This guide is a connection address for accessing information about the printer 1 stored in and managed by the internet server 6, for example, a Uniform Resource Locator (URL), a two-dimensional code including the connection address, or the like. The guide can lead to the password setting screen in response to the entry of the connection address in one of these forms. The two-dimensional code is, for example, a quick response (QR) code (trademark registered).

Figure 4:
FIG. 4 shows an example of a message printed or generated and outputted when a password is not set yet.

FIG. 4 shows an example of the setting information that is printed and outputted when a password is not set yet. The setting information in this example is formed of a combination of a connection address as address information, for example, a URL, and a two-dimensional code including information of the connection address, and a warning message. As a matter of course, it is allowable to print only the URL or the two-dimensional code leading to the password setting screen. However, these may be printed in combination with the warning message.

The contents of the warning message describe at least that a password is not set yet, that communication via the network cannot be carried out normally if a password is not set, and/or that the password setting screen should be accessed, using the URL or the two-dimensional code.

The processor 14 controls transmission and reception of data, protection or limitation by a password, and output by the printing unit 13, based on the control program and output data stored in the memory unit 12.

The processor 14 has a central processing unit (CPU) 21, a password setting unit 22, a password management unit 23, and a mode management unit 24.

Of these components, the central processing unit 21 performs arithmetic processing based on a control program. The central processing unit 21 processes data transmitted from the personal computer 3 into print data and controls the printing unit 13 to print and output.

The password setting unit 22 sets a password in response to an input operation on the personal computer 3. At this time, the password setting screen read out from the internet server 6, using the two-dimensional code, is displayed on the display screen of the personal computer 3. A password desired by the manager is entered by a key input operation on the personal computer 3, based on a guidance instruction on the password setting screen. The password setting unit 22 determines whether the entered password satisfies a password setting condition (for example, a combination of alphabet letters and numerals and the number of letters or the like). If the password satisfies the setting condition, the password setting unit 22 permits the setting. If the password does not satisfy the setting condition, the password setting unit 22 prompts a re-entry. The permitted password is stored in a predetermined table in the memory unit 12. The passwords can be rewritten when appropriate.

The password management unit 23 manages whether a password is set or not and a set password, and collates a password that is entered for reference with a password that is already registered. The mode management unit 24 manages a processing mode that can be executed based on whether a password is set or not. If there is no permission based on a matching password, the mode management unit 24 prohibits the execution of the processing mode.

The setting of a password will now be described with reference to a flowchart shown in FIG. 3. First, the printer 1 is connected to the network 2 where the server 4 is provided (Act 1). This connection is connection via a cable to the network 2, for example, Ethernet, or wireless connection by Wi-Fi (trademark registered). The personal computer 3 is connected in the state of being able to communicate with the network 2.

Next, the power of the printer 1 is turned on to start up the printer 1 (Act 2). An IP address is allocated to the printer 1 from the server 4 (Act 3). The central processing unit 21 acquires the IP address and subsequently determines whether a password is set or not (Act 4). Specifically, the central processing unit 21 checks with the password management unit 23 whether a password is already set or not, based on the control program. The password management unit 23 outputs a confirmation signal indicating that a password is already set or a confirmation signal indicating that a password is not set yet to the central processing unit 21.

On receiving the confirmation signal, the central processing unit 21 displays a message showing that a password is already set (Act 5) if a password is already set (YES in Act 4). The display of this message may be, for example, shown on the screen of the display unit of the personal computer 3 or printed and outputted by the printing unit 13. After this display, the central processing unit 21 enables execution of a mode protected by a password in response to an access from an external device via the network 2, in this case, enables network communication (Act 6).

Meanwhile, on receiving the confirmation signal, the central processing unit 21 displays that a password is not set yet on the display screen of the personal computer 3 (Act 7) if a password is not set yet (NO in Act 4). Immediately after that, the central processing unit 21 shifts to a password setting mode, which enables password setting and disables an execution instruction for the other modes (Act 8).

After shifting to the password setting mode, the central processing unit 21 causes the printing unit 13 to print and output, on a predetermined print sheet, a warning message and a guide that leads to the password setting screen, which are the setting information as shown in FIG. 4 (Act 9). This guide is guide information for easy setting of a password, as described above, and in this embodiment, leads to the password setting screen using the two-dimensional code. Subsequently, the two-dimensional code printed with the warning message is read by a reading device (a camera, a scanner, etc.) provided in the personal computer 3 or by the mobile device 7 such as a smartphone. Thus, the password setting screen is displayed on the display device of the personal computer 3 or the mobile device 7.

Then, the user of the printer 1 carries out an input operation, following password setting procedures displayed on the screen, and enters a desired password. The central processing unit 21 determines whether a password is entered from the personal computer 3 or not (Act 10). If the result of this determination is that a password is entered (YES in Act 10), the password setting unit 22 determines whether or not the entered password satisfies a password setting condition (for example, a combination of alphabet letters and numerals, and the number of letters) that is designated in advance (Act 11). Meanwhile, if a password is not entered in Act 10 (No in Act 10), the central processing unit 21 waits until a password is entered.

If the result of this determination is that the entered password satisfies the setting condition (YES in Act 11), this password is registered into the password setting unit 22. The central processing unit 21 displays that the password setting is complete on the display screen of the personal computer 3 or the mobile device 7 (Act 12).

Meanwhile, if the entered password does not satisfy the setting condition in Act 11 (NO in Act 11), the central processing unit 21 displays a re-entry instruction on the display screen of the personal computer 3 or the mobile device 7. The central processing unit 21 then returns to the setting screen of Act 10 and waits for the re-entry of a password.

Subsequently, after displaying that the password setting is complete in Act 12, the central processing unit 21 shifts to Act 6. That is, the central processing unit 21 enables a mode protected by a password so that the mode becomes executable in response to an access from an external device via the network 2.

As described above, when newly installed or replaced, the printer 1 in this embodiment prints a guide showing procedures for setting a password to the user if a password is not set yet. The user is, for example, an installation worker or manager. In the guide, a URL or a two-dimensional code including information of the URL is printed and outputted as the address information for accessing the password setting screen. Therefore, by referring to the guide, the user can easily access the password setting screen and check the password setting procedures. That is, the user can easily reach the password setting screen even without checking the user manual or specifications. Also, since the guide is printed, an oversight of password setting or failure to remember to set a password can be prevented.

The guide also shows a warning message. Therefore, the influence of not setting a password and the essentiality of setting a password can be indicated. Thus, an oversight of work and failure to remember to set a password can be further prevented.

Application Example

Figure 5:
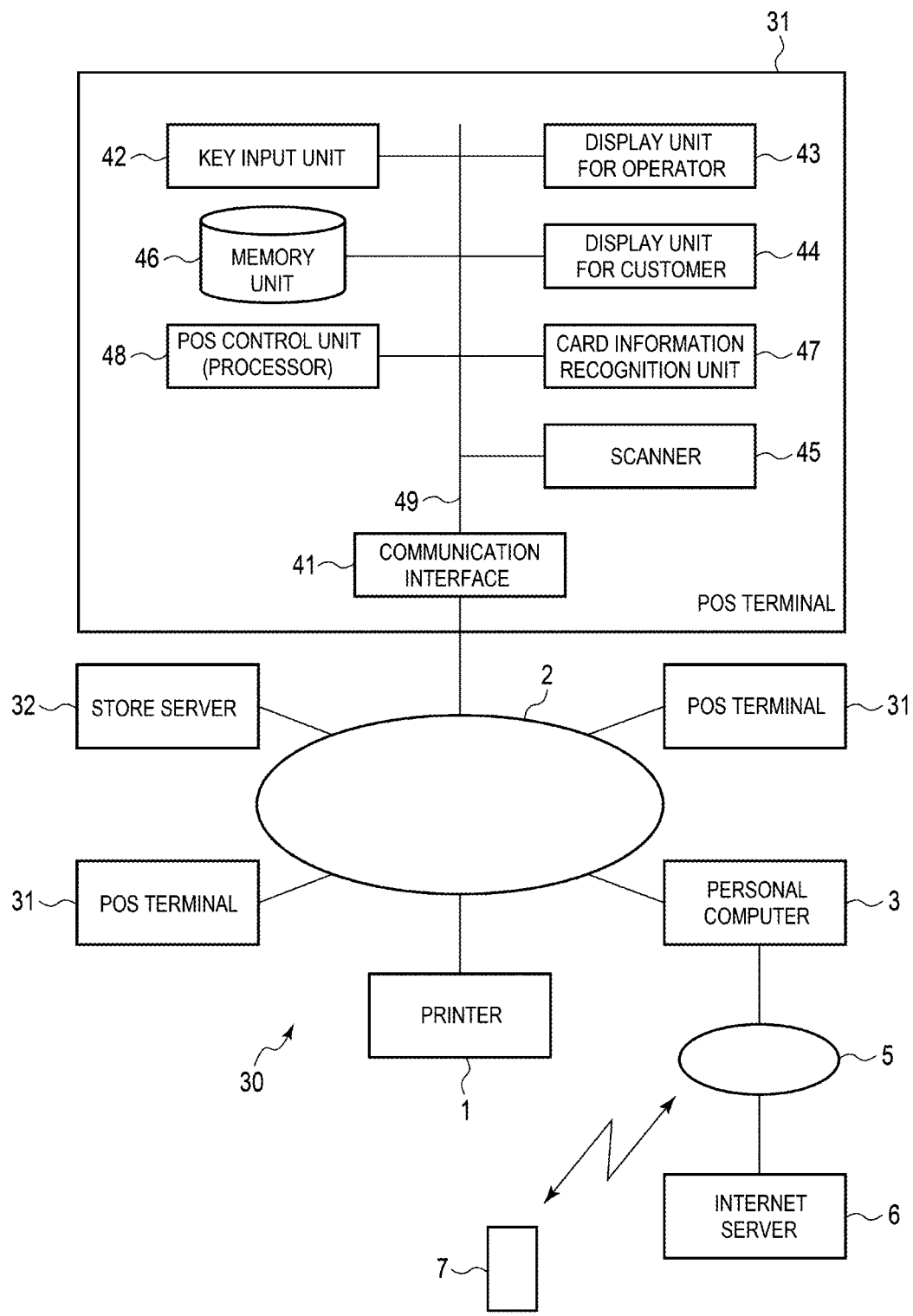
FIG. 5 shows an application example where the information processing device is used for a point-of-sale (POS) system.

A specific example where a network system including a printer 1 according to an embodiment is applied to a POS system will now be described with reference to FIG. 5. In the configuration in this application example, components equivalent to the components in FIG. 2 are denoted by the same reference signs, and detailed description of these components is omitted.

A POS system 30 has a plurality of POS terminals 31, a store server 32, a personal computer 3, and a printer 1 on a network 2 (e.g., a LAN). The printer 1 functions as a receipt printer that prints a receipt. The printer 1 may function as a payment slip printer that prints a credit card payment slip. The printer 1 may be a pocket printer which the user carries and uses in this state. The store server 32, the personal computer 3, and each POS terminal 31 are connected in such a way as to be able to communicate bidirectionally in the network 2 installed in a store.

The POS terminal 31 is formed of a communication interface (I/F) 41, a key input unit 42 (keyboard, input interface, etc.), a display unit for operator 43 (operator display), a display unit for customer 44 (customer display), a scanner 45, a memory unit 46, a card information recognition unit 47 (card reader), and a POS control unit (processor, controller, etc.) 48, which are connected to each other via a bus 49.

The communication interface 41 transmits and receives data in conformity with a communication protocol to and from the store server 32, the personal computer 3, and the printer 1, which are connected via the network 2.

The key input unit 42 is an input keyboard having various function keys. This keyboard is provided with various keys such as ten keys for entering at least numeric values "00" and "0" to "9", a cancel key, a PLU key, a clear key, a subtotal key, a deposit or current total key, and/or a total credit sales key. The key input unit 42 also includes a touch pad provided on a display (e.g., a liquid crystal display) of the display unit for operator 43 and the display unit for customer 44.

The display unit for operator 43 displays the commodity name, unit price, cumulative amount, total amount and the like of a commodity inputted via the key input unit 42. The display unit for customer 44 displays the unit price, total and the like of a commodity to be purchased.

The memory unit 46 includes a non-volatile memory area formed of, for example, a ROM, and a volatile memory area formed of, for example, a RAM. The memory unit 46 stores a control program and the like in the non-volatile memory area. The memory unit 46 stores, in the volatile memory area, data that is necessary for the POS control unit 48 to execute processing to control each part, for example, the latest information that is constantly updated, of information about individual commodities including prices, commodity management information including inventories, and sales promotion information. That is, the volatile memory area is also used as a work area for the POS control unit 48.

The scanner 45 reads commodity information from a barcode printed on each commodity, a barcode on a seal attached to each commodity, or an RF tag. The commodity information thus read is converted into commodity information such as the commodity category, commodity name and price of the commodity and written into the memory unit 46 by the processor 48 as settlement data.

The POS control unit 48 controls each component in the POS terminal 31 according to the control program. The store server 32 manages each POS terminal 31 in the store. The store server 32 can also relay data or an instruction transmitted from the personal computer 3 and transmit the data or the instruction simultaneously to the individual POS terminals 31.

Figure 3:
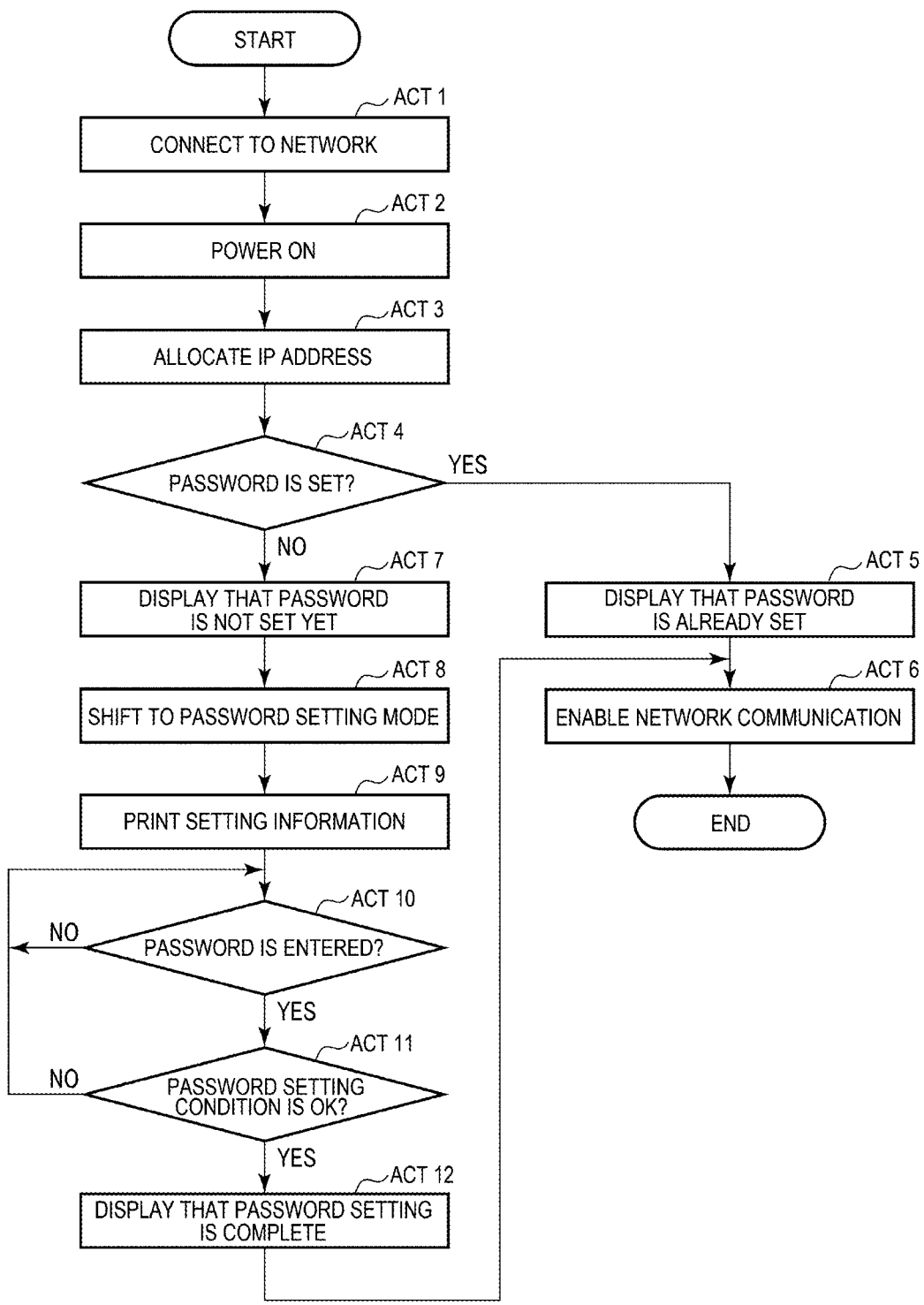
FIG. 3 is a flowchart for explaining password setting.

The password setting on the printer 1 in the POS system 30 configured as described above is fundamentally equivalent to the setting procedures shown in FIGS. 3 and 4 described above and therefore will be briefly described.

The manager (or installation worker) connects a new printer 1 to the network 2 in the POS system 30 by newly installing the printer 1 or by replacing an already installed printer with the printer 1. The manager turns on the power of the printer 1.

Next, as the power is turned on, the printer 1 starts up and an IP address is assigned to the printer 1 from the store server 32 managing the network 2. After the IP address is assigned, the central processing unit 21 of the printer 1 checks with the password management unit 23 whether a password is already set or not, according to the control program. If a password is already set as the result of this check, the central processing unit 21 causes the printing unit 13 to print and output a message showing that a password is already set, on a predetermined sheet paper. After the print and output, a mode protected by a password becomes executable in response to an access from the POS terminal 31 via the network 2. For example, the printer 1 is enabled to print and output data transmitted from the POS terminal 31.

Meanwhile, if a password is not set yet, only the password setting mode is enabled and the execution of the other modes is disabled. After this setting, the printing unit 13 prints and outputs the warning message and the two-dimensional code, described above, on a predetermined sheet paper, for example, a roll paper for receipt.

The manager causes the reading device provided in the personal computer 3 or the mobile device 7 such as a smartphone to read the two-dimensional code, and thus causes the password setting screen to be displayed. The manager carries out an input operation on the personal computer 3 and enters a desired password, following the password setting procedures displayed on the screen. The password setting unit 22 of the printer 1 determines whether or not the entered password satisfies a password setting condition that is designated in advance.

If the entered password satisfies the setting condition, this password is registered as a password in the password setting unit 22 and stored into the memory unit 46. After this storage is complete, that the password setting is complete is displayed on the display screen of the personal computer 3.

As described above, in this application example, password setting, which is one of the work items that the user tends to forget when newly installing a printer or replacing the existing printer in a POS system, can be executed securely and easily.

Even a manager or worker who has forgotten or is unfamiliar with password setting procedures can set a password accurately and easily because the password setting procedures are displayed on the screen.

While an aspect of the disclosure and several embodiments have been described, these aspect and embodiments are presented simply as examples and are not intended to limit the scope of the disclosure. These novel aspect and embodiments can be carried out in various other forms and can include various omissions, replacements, and modifications without departing from the scope of the disclosure. These aspect and embodiments, and the modifications thereof, are included in the scope of the disclosure and also included in the scope of the claims and equivalents thereof.

What is claimed is:

1. An information processing device with a password function, the information processing device comprising:
   a communication interface configured to communicate via a network;
   a printer;
   a memory configured to store a password set by a user; and
   a processor configured to:
      acquire setting information for the information processing device and address information from a server on the network via the communication interface when the communication interface is connected to the network, the setting information including a password setting state, the address information including information for accessing a password setting screen for setting the password;
      check the password setting state of the password based on the setting information;
      control the printer to print and output a guide displaying the address information to direct the user to the password setting screen in response to the password not being set, wherein the guide displays the address information in the form of (i) a URL that directs the user to the password setting screen when entered into a user device and (ii) a two-dimensional code that directs the user to the password setting screen when read by the user device; and
      control the printer to print and output a message indicating that the password is set.

2. The information processing device of claim 1, wherein the guide displays the address information along with warning information that the password is not set in response to the password not being set.

3. The information processing device of claim 1, wherein the processor is configured to store the password entered via the password setting screen in the memory.

4. The information processing device of claim 1, wherein the processor is configured to:
   check the password setting state of the password when the communication interface is connected to the network; and
   enable a function of the printer that is protected by the password if the password is already set.

5. The information processing device of claim 1 wherein, in response to the user accessing the password setting screen with the user device using the address information printed on the guide and setting the password, the processor is configured to:
   store the password entered via the password setting screen in the memory; and
   enable a function of the printer that is protected by the password.

6. A password setting method for an information processing device with a password function, the method comprising:
   acquiring, by a processor of the information processing device, setting information for the information processing device and address information from a server on a network when a communication interface of the information processing device is connected to the network, the setting information including a password setting state, the address information including information for accessing a password setting screen for setting a password;

checking, by the processor of the information processing device, the password setting state based on the setting information;

if the password is not set, printing and outputting, by the processor via a printer of the information processing device, a guide displaying the address information to direct a user to the password setting screen, wherein the guide displays the address information in the form of (i) a URL that directs the user to the password setting screen when entered into a user device and (ii) a two-dimensional code that directs the user to the password setting screen when read by the user device; and controlling, by the processor, the printer to print and output a message indicating that the password is set.

7. The method of claim 6, wherein the guide displays the address information along with warning information that the password is not set in response to the password not being set.

8. The method of claim 6, further comprising enabling, by the processor, a function of the printer that is protected by the password if the password is already set.

9. The method of claim 6, further comprising, in response to the user accessing the password setting screen with the user device using the address information printed on the guide and setting the password:

storing, by the processor, the password entered via the password setting screen in a memory of the information processing device; and enabling, by the processor, a function of the printer that is protected by the password.

10. A non-transitory computer-readable medium having instructions stored thereon that, when executed by one or more processors of an information processing device, cause the one or more processors to:

acquire setting information for the information processing device and address information from a server on a network when a communication interface of the information processing device is connected to the network, the setting information including a password setting state, the address information including information for accessing a password setting screen for setting a password;

check the password setting state based on the setting information;

control a printer to print and output a guide displaying the address information to direct a user to the password setting screen in response to the password not being set, wherein the guide displays the address information in the form of (i) a URL that directs the user to the password setting screen when entered into a user device and (ii) a two-dimensional code that directs the user to the password setting screen when read by the user device; and control the printer to print and output a message indicating that the password is set.

11. The non-transitory computer-readable medium of claim 10, wherein the guide displays the address information along with warning information that the password is not set in response to the password not being set.

12. The non-transitory computer-readable medium of claim 10, wherein the instructions cause the one or more processors to enable a function of the printer that is protected by the password if the password is already set.

13. The non-transitory computer-readable medium of claim 10, wherein, in response to the user accessing the password setting screen with the user device using the address information printed on the guide and setting the password, the instructions cause the one or more processors to:

store the password entered via the password setting screen in a memory of the information processing device; and enable a function of the printer that is protected by the password.

\* \* \* \* \*